(12) United States Patent
Shayer (10) Patent No.: US 9,099,204 B2
(45) Date of Patent: Aug. 4, 2015

(54) NUCLEAR BATTERY BASED ON HYDRIDE/THORIUM FUEL

(75) Inventor: Zeev Shayer, Denver, CO (US)

(73) Assignee: COLORADO SCHOOL OF MINES, Golden, CO (US)

( * ) Notice: Subject to any disclaimer, the term of this patent is extended or adjusted under 35 U.S.C. 154(b) by 542 days.

(21) Appl. No.: 13/386,629

(22) PCT Filed: Jul. 21, 2010

(86) PCT No.: PCT/US2010/042730
§ 371 (c)(1),
(2), (4) Date: May 8, 2012

(87) PCT Pub. No.: WO2011/011504
PCT Pub. Date: Jan. 27, 2011

(65) Prior Publication Data
US 2012/0219102 A1    Aug. 30, 2012

Related U.S. Application Data

(60) Provisional application No. 61/228,104, filed on Jul. 23, 2009.

(51) Int. Cl.
*G21C 3/42* (2006.01)
*G21C 3/00* (2006.01)
*G21C 5/02* (2006.01)

(52) U.S. Cl.
CPC .. *G21C 3/00* (2013.01); *G21C 3/42* (2013.01); *G21C 5/02* (2013.01); *Y02E 30/40* (2013.01)

(58) Field of Classification Search
USPC ......... 376/320–322, 347, 419, 421, 423, 427; 310/301; 136/202
See application file for complete search history.

(56) References Cited

U.S. PATENT DOCUMENTS

| | | | | |
|---|---|---|---|---|
| 3,072,549 | A | * | 1/1963 | Koutz .......................... 376/419 |
| 3,086,933 | A | | 4/1963 | Nagey et al. |
| 3,759,786 | A | * | 9/1973 | Abate-Daga .................. 376/419 |
| 4,608,222 | A | | 8/1986 | Brueckner |

(Continued)

FOREIGN PATENT DOCUMENTS

| | | |
|---|---|---|
| WO | WO2006/088516 | 8/2006 |
| WO | WO2011/011504 | 1/2011 |

OTHER PUBLICATIONS

Colozza, "Hydrogen Storage for Aircraft Application Overview", NASA/CR-2002-211867 (Sep. 2002).

(Continued)

*Primary Examiner* — Jack W Keith
*Assistant Examiner* — Daniel Wasil
(74) *Attorney, Agent, or Firm* — Dorsey & Whitney LLP (57) ABSTRACT

Methods, processes, and systems of transportable nuclear batteries are provided. In one embodiment, the battery may comprise a sealed reactor shell, a reactor core, and a generator. In further embodiments, the transportable nuclear battery may comprise a nuclear fuel in the reactor core wherein the fuel comprises plutonium, carbon, hydrogen, zirconium and, thorium. In some embodiments, the fuel may comprise hydrogen-containing glass microspheres, wherein the glass microspheres, may be coated with a burnable poison, and other coating materials that may aid in keeping the hydrogen within the microsphere glass at relatively high temperature. The disclosed methods, processes and systems may aid in providing energy to remote areas.

10 Claims, 6 Drawing Sheets

THE FUEL ELEMENT CONFIGURATION
THAT USED IN THIS STUDY

(56) References Cited

U.S. PATENT DOCUMENTS

2006/0059953 A1* 3/2006 Heung et al. .................. 65/440
2008/0144762 A1* 6/2008 Holden et al. ................ 376/416

OTHER PUBLICATIONS

Powell et al. "Compact, Deployable Ultra Lightweight Multi-Megawatt Nuclear Power Systems for Very Long Range Electromagnetic Launchers", Electromagnetic Launch Technology 14$^{th}$ Symposium (2008).

Shayer et al. "Physics Characteristics of U-ZrH1.6 Fueled PWR Cores", PHYSOR 2004, The Physics of Fuel Cycles and Advanced Nuclear Systems: Global Developments, Chicago, Illinois, Apr. 25-29, 2004.

Shayer, "Use of Solid Hydride Fuel for Improved Long-Life LWR Core Design", Neutronics Parametric Analysis: U-ThH2 Unit Cell in PWR, NERI Project, Jan. 5, 2003.

Talamo et al. "Alternative Configurations for the QUADRISO Fuel Design Concept", Journal of Nuclear Materials 383 (2009) pp. 264-266.

International Search Report for International Application No. PCT/US2010/042730 dated Aug. 31, 2010, 1 page.

* cited by examiner

THE FUEL ELEMENT CONFIGURATION
THAT USED IN THIS STUDY

FIG.3

SCHEMATIC VIEW OF MICROSPHERE GLASS FILLED WITH HYDROGEN

FIG.4

HEXAGONAL BASIC GRAPHITE BLOCK FOR REACTOR CORE CONFIGURATION

FIG.12

NUCLEAR BATTERY BASED ON HYDRIDE/THORIUM FUEL

CROSS REFERENCE TO RELATED APPLICATIONS

This PCT patent application claims priority to U.S. patent application Ser. No. 61/228,104, entitled 'Nuclear Battery Based on Hydride/Thorium Fuel", filed on Jul. 23, 2009, the contents of which are incorporated herein by reference in their entirety.

FIELD

This technology relates generally to portable nuclear fuel reactors.

BACKGROUND

Presently, there are approximately 150 metric tons of known weapons grade plutonium and approximately 850 metric tons of known reactor-grade plutonium in the world, with 50 metric tons of reactor-grade plutonium being produced every year. There is likely to be more such plutonium in the world that is unaccounted for. Since these types of plutonium can be used to make weapons of mass destruction, such as thermonuclear bombs and dirty bombs, it is desirable to process any such plutonium so as to render the plutonium difficult to use in making a weapon of mass destruction or to transform any such plutonium into a form that is difficult to use in making any kind of weapon of mass destruction.

Currently, there are two approaches to processing weapons-grade and reactor-grade plutonium such that the end product is either difficult or substantially impossible to use in constructing a weapon of mass destruction. The first approach is to immobilize the plutonium. Typically, this approach involves immobilizing plutonium powder in a glass matrix and then placing the plutonium/glass matrix in a secure storage location. The second approach is to incorporate the plutonium in a nuclear fuel that is burned at a nuclear power plant. The burning of such a fuel results in much of the plutonium being transformed into an isotope that is unsuitable for use in a weapon of mass destruction. Presently, a plutonium-based nuclear fuel that is being used to reduce the supply of plutonium that might be used to produce a weapon is a blend of plutonium-239 and natural or depleted uranium, which is commonly referred to as a mixed oxide fuel (MOX).

There are plutonium-based nuclear fuels suitable for use in a light water reactor (LWR) generating electricity and in which ordinary water is used as a coolant and a moderator to slow down neutrons to the point where their energy ranges fall into the range of higher fission probability. There are two types of LWR, namely, a pressurized water reactor (PWR) and a boiling water reactor (BWR). The plutonium-based nuclear fuel is comprised of plutonium, zirconium hydride, and thorium, which may act as a moderator inside the fuel. In one embodiment, the zirconium hydride comprises 20-50% by weight of the fuel.

Alternatively, the plutonium is less than 10% by weight of the fuel; the zirconium hydride is 20-50% by weight of the fuel; and the thorium is 20-50% by weight of the fuel. Further alternatives of the fuel, have about 40-94% of the plutonium in the fuel as plutonium-239. Other alternative fuel a comprises a zirconium hydride in which the hydrogen to zirconium ratio is in the range of about 1.6-1.8. These fuels may also be used in an LWR reactor, e.g., a TRIGA reactor (Training Research Isotopes General Atomics).

There are benefits to using zirconium hydride alloy fuel in nuclear reactors, at least in part because of its safety characteristics. In fuel the moderator and fuel are intimately mixed. Among the research reactors that commonly use this type is the TRIGA reactor. The NERI program in applying this fuel to the LWR (Z. Shayer and E. Greenspan "Physics Characteristic of U-ZrH$_{1.6}$Fueled PWR Cores", PHYSOR 2004, Chicago, Ill., Apr. 25-29, 2004)

The introduction of hydrogen within the fuel permits attainment of neutron moderation to aid plutonium incineration by thermalizing more neutrons, enhancing the neutron absorption probability in the 0.3 eV resonance peak of Pu-239. Use of this fuel may have several advantages over the existing MOX (Mixed Oxide fuel, blends of Uranium and Plutonium oxide) fuel: (a) increased core-life; (b) increased energy generation per fuel loading; (c) reduced waste volume and toxicity due to higher discharge number and to partial utilization of thorium; (d) utilization of thorium resources; (e) improved safety due to the large negative temperature coefficient; (f) improved proliferation resistance by burning up more plutonium and use of thorium; (g) additional significant benefits of the proposed zirconium hydride matrix are better thermal conductivity and fuel storage heat capacity; and (h) the reported experiments with TRIGA fuels indicated low fission gas release.

The neutronic parametric study previously reported is limited directed mainly to infinite pin cell calculations that were performed by WIMSD-5B (WIMSD-5B (98/11), "Deterministic Code System for Reactor-Lattice Calculations", RSICC CCC-656, user manual (1998), (WIMSD-5B stands for Winfrith Improved Multigroup Scheme Version D-5B, computer code) a deterministic code for reactor core lattice calculations. This code was benchmarked for hydride fuel applications against the well-established codes such as MCNP4B2 and SCALE4.4 codes to provide additional justification of the applicability of the code for the hydride fuel parametric study. Generally there was very good agreement between the codes for various ranges of neutronic parameters and spectrum (Z. Shayer, Neutronic Parametric Analysis: U-ZrH$_{1.6}$ Unit Cell in PWR NERI Project—Rev.4, NERIO2-189-TM 2 (2003).

Figure 1:
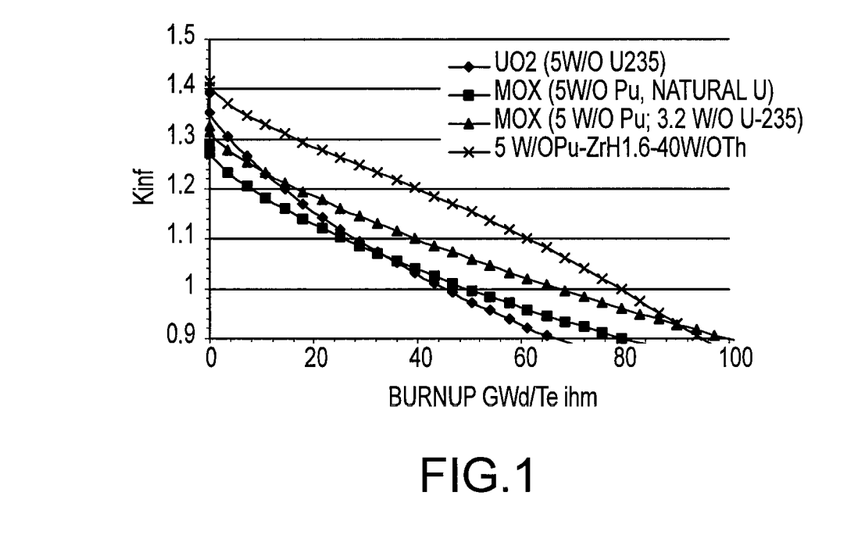
FIG. 1 Comparison of $K_\infty$ versus burnup for MOX, Pu/ZrHx/Th and UO2
Figure 2:
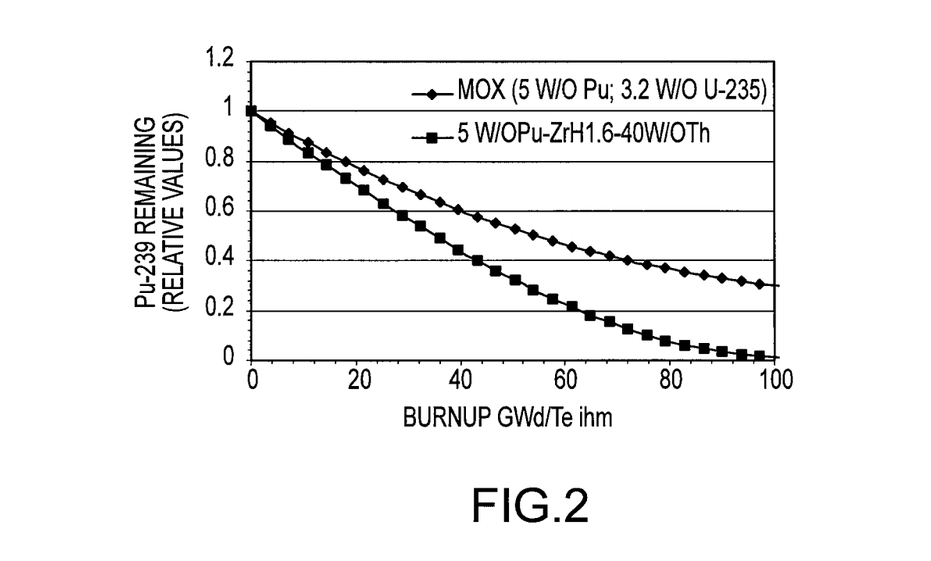
FIG. 2 The destruction rate of Pu-239 relative to initial loading

The initial analysis shows significant advantages of the proposed fuel over the MOX for incineration of plutonium. Several calculations were performed by the WIMSD-5B to determine the benefit of Pu/ZrH$_x$/Th matrix fuel. FIG. 1 is a sample of the results obtained from this study, which shows the variation of K$_\infty$ (K$_{inf}$ Infinite—Multiplication factor for neutrons)) versus burnup (in GWd/Te ihm; GW days per ton equivalent initial heavy metal [U or Th]) for several fuel types (MOX and oxide fuel). The presence of some Th-232 provides additional fissile material through conversion of Th-232 to U-233, which increases the discharge burnup values to around 80,000 MWd/Te as compared to MOX fuel with LEU (Low Enriched Uranium) that reached only to 65,000 MWd/Te (At K$\infty$=1.03 for a single batch). For a comparison, the discharge burnup value of HEU oxide fuel is only about 45,000 MWd/Te. From FIG. 2 we can see that the destruction rate of Pu-239 is significantly better fast compared to the destruction rate of than the MOX fuel, at 50,000 MWd/Te for MOX fuel, only about 50% of initial Pu-239 is consumed as compared to about 70% for the proposed fuel. This value is increase to 92% for the Pu/ZrH$_x$/Th matrix fuel as compare to only 63% for MOX at 80,000 MWd/Te. The preliminary results show that this fuel is may be suitable ideal for the non-proliferation program to dispose of weapon and power grades plutonium. In this example the calculations were performed for typical PWR rods. The fuel, clad and water temperatures were assumed to be 978 K, 607 K and 579 K, respectively.

Initial results indicated that this Pu/ZrH$_x$/Th matrix fuel would may be very attractive to the disposition of weapon and power grades plutonium. The fuel destruction rates measured in the non-limiting examples described above, were is almost an order of magnitude higher than conventional MOX fuel of containing plutonium. Due to the higher discharge burnup in a smaller core volume, with beneficial safety characteristics and a high prompt reactivity coefficient, a Pu/ZrHx/Th matrix fuel with Zr or SS cladding offers excellent advantages over the conventional MOX fuel for plutonium disposition.

SUMMARY

The present disclosure is directed to transportable nuclear batteries comprising, sealed reactor shell; a reactor core; and a generator. The transportable nuclear battery may further comprises a nuclear fuel comprising in the reactor core wherein the fuel comprises plutonium, carbon, hydrogen, zirconium and, thorium. The fuel may further comprise hydrogen containing glass microspheres, wherein the glass microspheres, may be coated with a burnable poison, and other coating materials that may aid in keeping the hydrogen within the microsphere glass at relatively high temperature.

BRIEF DESCRIPTION OF THE FIGURES

FIG. 8 15 wt % Pu/55 wt % ZrH1.6/30 wt % Th plus 9 wt % U-235 added to the blanket: Seed, Power Grade Plutonium; Blanket, ThC plus 9 wt % U-235

DETAILED DESCRIPTION

The use of nuclear battery to serve remote sites without ready access to fuel is not new. In the 1960s, the U.S. Army Portable Nuclear Power Program deployed several small nuclear plants at locations such as Greenland and Antarctica. Since then several advanced concept studies, sponsored by government and industry, have addressed the problem with similar conclusions, i.e., it is extremely difficult for small nuclear plants to be cost-competitive with diesel generators and gas turbines, even with high fuel and maintenance costs. The main reason is that previous small nuclear plant concepts were burdened with the same safety requirements and sophisticated technical infrastructure as large nuclear plants. Additional concerns for security and nonproliferation generally have made small, remotely-sited nuclear reactors unattractive. Nevertheless, it may be time to re-examine the "small reactor dream." There are two reasons: there is greater incentive for reducing the economic disparity between remote and central communities, and the available technology for solving problems unique to small remote reactors has evolved substantially in the last decade.

Figure 3:
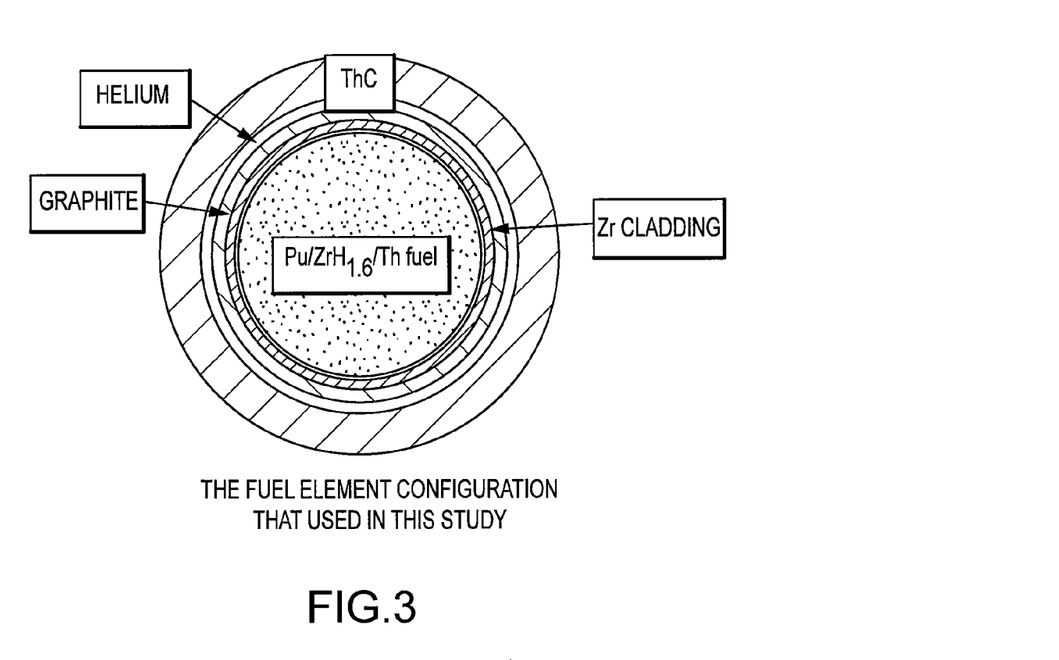
FIG. 3 The Fuel Element Configuration that used in this Study

The Nuclear Thorium/Hydride Fuel Battery (NTHFB) is a novel reactor concept based in part on the fuel element depicted in FIG. 3. In this reactor, fission-generated heat may be transferred to gas turbine to generate electricity. This may allow the reactor module to have a simplified design, and to provide electricity, heat or hydrogen to the remote areas, or to serves as backup system to the renewable energy systems such as, without limitation, wind or solar. The NTHFB module may be fabricated and fueled in the factory and transported to the site sealed, for example, without limitation, by welding. The NTHFB may operate for 10-20 years without refueling and with limited reactivity swing. After its operational life, it may be replaced by another module, and the old module may be transported to a nuclear waste repository site or a fuel recycling system. The electricity range of the proposed battery may be 0.1-50 MWe (MegaWatt electricity). The proposed small reactor may be also useful for space exploration program.

The proposed Nuclear Battery may provide for various benefits such as, without limitation, a sealed module that may never need to be opened on site, it may provide enough power for 10-30 years, it may be capable of being removed & refueled, or buried underground out of sight without risk to environment, the proposed battery may also be transportable by train, ship, truck, and may in some cases lack mechanical parts in the core to malfunction thus leading to an inherent safety. The proposed battery may also not produce greenhouse gases which may lead to global warming emissions.

The proposed Nuclear Battery may further aid in providing inherently safe, secure power to remote communities, hospital, and military bases. The proposed battery may be able to provide steady-state power in the range of 10 to 100 MWe. This power range may be sufficient for communities of 10,000 to 50,000 people. In addition, the battery could provide heat for district heating or for desalination of seawater, or hydrogen production. The battery and associated equipment may be transportable by truck over rural roads. The battery may also be monitored from a central point through a variety of communications methods for example, satellite uplink, cellular phone, or radio. The fuel may be made from ultra-high quality coated particle fuel and may aid in preventing radioactive contamination of power equipment and may also aid in preventing radioactivity releases even in the event of accidents. The proposed nuclear battery may serve as an energy source for a variety of methods and for various purposes including without limitation, electricity through Bryton cycle (with efficiency of 50%), thermoelectric, heat, water desalination, or hydrogen production.

In solid hydride fuel, the moderator (hydrogen) may be placed inside the fuel. The hydride fuel may be based on, for example, Uranium, Plutonium and Thorium. Very Light fuel may be beneficial for applications in space, which may include without limitation, power production for propulsion, electronic systems, optics systems as well as electric batteries for stationary settlements, manned and unmanned, on planets or satellites of solar system.

Space exploration may benefit from power systems able to provide electricity in the range of hundreds to thousands of KWe (KiloWatt electricity). The light weight fission based system may provide a viable compact technology system that may provide electricity in these ranges of power, and may do so in a safe reliable and economical manner. The present disclosure is directed toward a light nuclear power reactor that may feed an electric engine, for example without limitation, on board a space craft for nuclear electric propulsion or for use at manned or unmanned stationary settlements. The present disclosure may also provide reliable reactor for long-time operability (for example in some embodiments for 15 years or longer) with little or no intervention (with minimum control requirements).

The presently disclosed system may be based on, for example without limitation, reactor technology developed for modular high temperature gas cooled reactors (HTGR). In some embodiments the present disclosure may provide for one or more of the following: minimization of overall mass and volume; using medium U-235 enrichment or plutonium for nuclear spent fuel (the use of plutonium may also alleviate nuclear waste problems); electrical power in the range of 100-5000 KWe; operating life time may be up to, or greater than 15 years; low core power density; and minimal use of fluids in the system, or no fluid at all.

In various embodiments, the reactor design may be based on the modular version of high temperature gas cooled reactor with, for example, the Brayton cycle.

Fuel composition may be based on hydride fuel type, for example without limitation, those used in TRIGA research reactor. In some embodiments, the moderator may be present in both the fuel and the coolant. Use of moderator in the fuel and coolant may impact the neutronic and safety characteristic of this core. The uranium-zirconium hydride fuel, in which the hydrogen moderator may be homogeneously distributed within a fuel, may lead to the large prompt negative fuel temperature coefficient of reactivity and may help to mitigate accidental reactivity insertion events and prevent fuel from melting.

In some embodiments, the density of this fuel may be around 8.2 g/cm$^3$ as compare to 10.2 g/cm$^3$ of UO$_2$, which is commonly used today in commercial nuclear power plants. The presently disclosed fuel may save about 20% in weight of the reactor compared to other fuel types. In addition TRIGA-type fuels, on which the presently disclosed fuel may be based, are considered to be inherently safe fuel types which may possess highly thermalized neutrons inside the fuel due to the presence of moderator within the fuel.

The presently disclosed fuel formulation may be based on TRIGA fuel compositions, for example without limitation a Pu/ZrHx/Th matrix fuel. This formulation may further reduce the mass of the core by additional 10-15%, due to the lower density of thorium (11.72 g/cc as compare to 19.2 g/cc of uranium).

The neutronic behavior of one embodiment of the currently disclosed fuel formulation may be described in Table 1.

Table 1 fissile isotopes are presented at thermal neutron energy of 0.0253 eV. Where, a is the ratio of capture-to-fission cross-section, and $\eta$ is the number of fission produced per neutron absorption, and $\upsilon$ is the number of neutrons produced per fission. The number of neutrons produced per neutron absorption, $\eta$, may provide a factor in determining the system's operational life-time and may indicate the ability to produced fissile isotopes for each fissile atom destroyed. Furthermore, in some embodiments, some neutrons may be absorbed in non-fuel material or may leak out from the reactor core, therefore Table 1 also lists the quantity of $\eta$-2 which the prospective fissile materials to breed fissile atoms.

TABLE 1

Basic nuclear data related to fissionable isotopes U-233, U-235, Pu-239 and Pu-241

| Nuclear Data | U-233 | U-235 | Pu-239 | Pu-241 |
|---|---|---|---|---|
| $\sigma_\gamma$ (barns) | 45.5 | 98.3 | 269.3 | 358.2 |
| $\sigma_f$ (barns) | 529.1 | 582.6 | 748.1 | 1001.1 |
| $\alpha$ | 0.086 | 0.169 | 0.360 | 0.354 |
| $\eta$ | 2.296 | 2.075 | 2.115 | 1.169 |
| $\eta$-2 | 0.296 | 0.075 | 0.115 | 0.169 |
| $\upsilon$ | 2.49 | 2.42 | 2.88 | 2.94 |
| Energy per Fission | 191 | 194 | 200 | 202 |

The currently disclosed fuel formulation may be used in at least two types of hydride based pellets fuel:

First type of fuel is Pu/ZrHx/Th fuel matrix as described above, and

Figure 4:
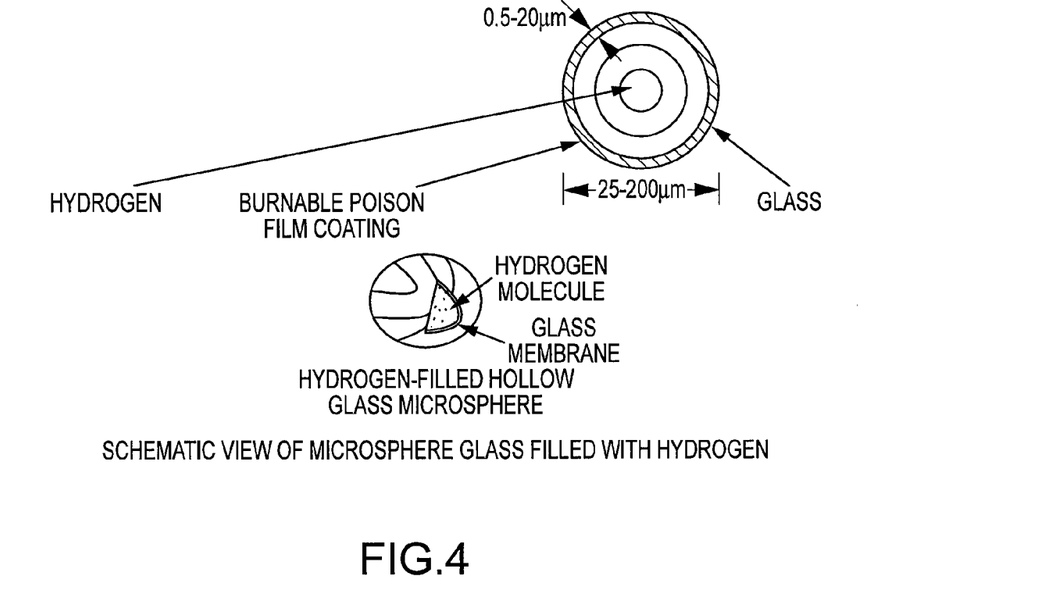
FIG. 4 Schematic view of microsphere glass filled with hydrogen

Conventional microsphere fuel types, for example without limitation, those similar to types used in Pebble Bed reactor or GA prismatic fuel (TRISO, tri-structural isotropic, particles) with highly enriched uranium or weapon grade/power grade plutonium in the form oxide or carbon (for example without limitation; UO$_2$, UC, UCO, PuO$_2$, PuC, PuCO). The fuel microsphere dimensions may be in the same range as conventional TRISO particles, for example without limitation, 300-350 μm. This microsphere fuel may be protected by as many as four carbon based layers. The carbon layers may comprise a low density carbon buffer, a high density pyrolitic carbon layer, a silicon carbide layer, and a high density pyrolitic carbon. The overall microsphere dimensions of the entire fuel particles may be in the range of 750-800 μm. In addition to the TRISO particles described above, microsphere glass, filled with hydrogen, may be used as a moderator (replacing the hydride fuel in form of ZrH$_x$) and to control the reactivity of the reactor core. The hydrogen-containing microspheres may be coated with burnable poison film, such as boron carbide or boron, erbium, etc. A schematic view of one possible embodiment of the microsphere glass is depicted in the FIG. 4. The, at least, two types of microsphere particles may be mixed together randomly or may be layered with graphite powder and then compacted to the cylindrical fuel pellets. In one embodiment, compact cylindrical pellets may be formed in the range of about two centimeters in length and about 1 cm in diameter. These pellet embodiments may be inserted into holes which may, for example, without limitation be drilled in a hexagonal graphite moderator block. This embodiment is illustrated in the FIG. 5.

In one embodiment of the hexagonal graphite moderator block, the center hydride fuel rod may be surrounded by six fertile material pellets. In this embodiment, the pellets may be made of thorium, such as for example without limitation, various forms of oxide, carbonate or hydrides (ThO$_2$, ThC, Th$_2$ . . . ). The fuel pellets may be made from this fuel formulation in various ways, such as for example, directly or in the form of TRISO particles and/or microsphere glass filled with hydrogen configuration as describe above.

In a further embodiment, where only fuel kernel replaced by fertile materials (thorium or U-238). Then the mixing these fertile fuels with microsphere glasses filled with hydrogen and thin film of burnable poison will be also examined in this study. The productions of the fertile pellets are similar to that of fuel pellets.

Figure 5:
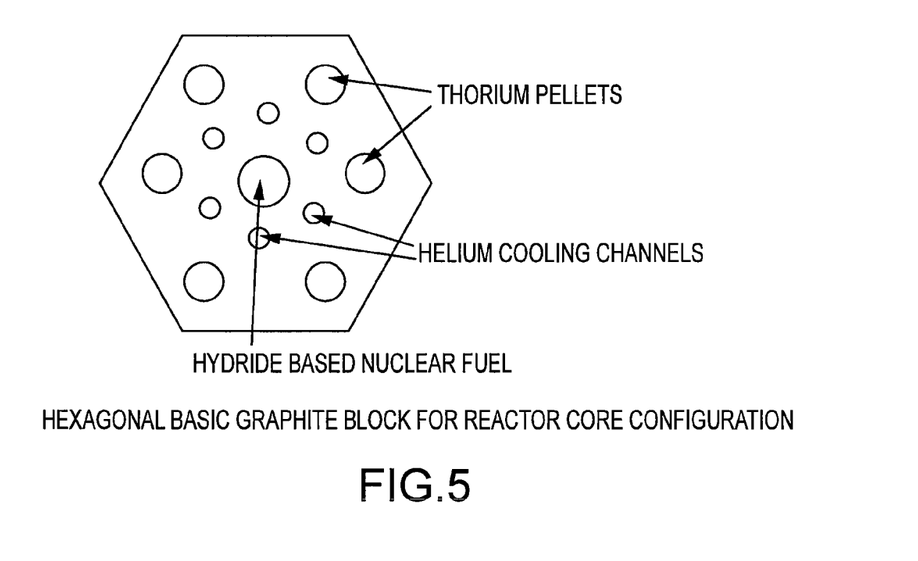
FIG. 5 Hexagonal Basic Graphite Block for Reactor Core Configuration

In some embodiments, a reactor core that may be capable of producing power in the ranges of couple of hundred KWth up to few MWth may be assembled with fuels described above. In some embodiments, the reactor may be comprised of several hundred hexagonal graphite blocks. In further embodiments, holes may be drilled for helium cooling system (FIG. 5 shows six holes, but the number may be greater or smaller in other embodiments). In some embodiments, the active core may be surrounded by reflector. The reflector thickness may vary from about two cm in some embodiments to more than two or less than two in other embodiments. In further embodiments, microsphere glass may be embedded in the reflector to aid reactivity control.

TRISO particles may reach 100 MWd/kg burnup without fission gas release or damage. The temperature and pressure will be determined by more detail analysis, including the coupling between the heat source (reactor core) and entire plant balance. In some embodiments, values of 800° C. may be achieved, however further embodiments may achieve temperatures above 900° C.

In various embodiments, a reduction in power density may provide for continuous operation time above 20 years, further embodiments may have a duration time of 30 years.

In various embodiments, an electrical generator may be used, for example without limitation a thermoelectric generator or a Brayton cycle.

Embodiments that include microsphere glass benefit from the control the reactivity, changes in the neutron spectra, or shifting the neutron energy profile during the reactor operation. In some embodiments, the neutron spectrum may be harder (more high energetic neutrons exist in the system). The hardness of the neutron spectrum may be due to presence of a thermal neutron absorber in the system (for example, without limitation burnable poison film). The thermal neutron absorber may tend to increase the absorption rate in the fertile thorium materials (high capture rate of neutrons in the resonance energy range). In some embodiments, depletion of a burnable poison during reactor operation may shift the neutron energy spectrum toward more softer spectrum (more low neutron energy). This shifting may be due to exposing more neutron to slowing down process with hydrogen collisions, for example, without limitation inside the microsphere glasses, this may improve the fuel utilization of the fissile material U-233, generated from neutrons absorption rate in Th-232.

Microsphere Glass Technology

The filling process of hydrogen may be aided by heating the spheres which may result in the permeability to hydrogen increasing. This heating, may provides the ability to fill the spheres by placing the warmed spheres in a high-pressure hydrogen environment. The hoop stresses achievable for glass microspheres can range from 345 Mpa (50,000 psi) to 1,034 Mpa (150,000 psi). Once cooled the spheres may lock the hydrogen inside. The fill rates of microspheres may be related to the properties of the glass used to construct the spheres, and may also vary with the temperature at which the gas is absorbed (for example without limitation, between 150° C. and 40° C., or greater than 150° C.) and may also vary with the pressure of the gas during absorption process. Fill rates may be directly proportional to the permeability of the glass spheres to hydrogen which increases with increasing temperature. For example, fill rate at 225° C. may be approximately 1 hour and at 300° C. it may be approximately 15 minutes.

Figure 6:
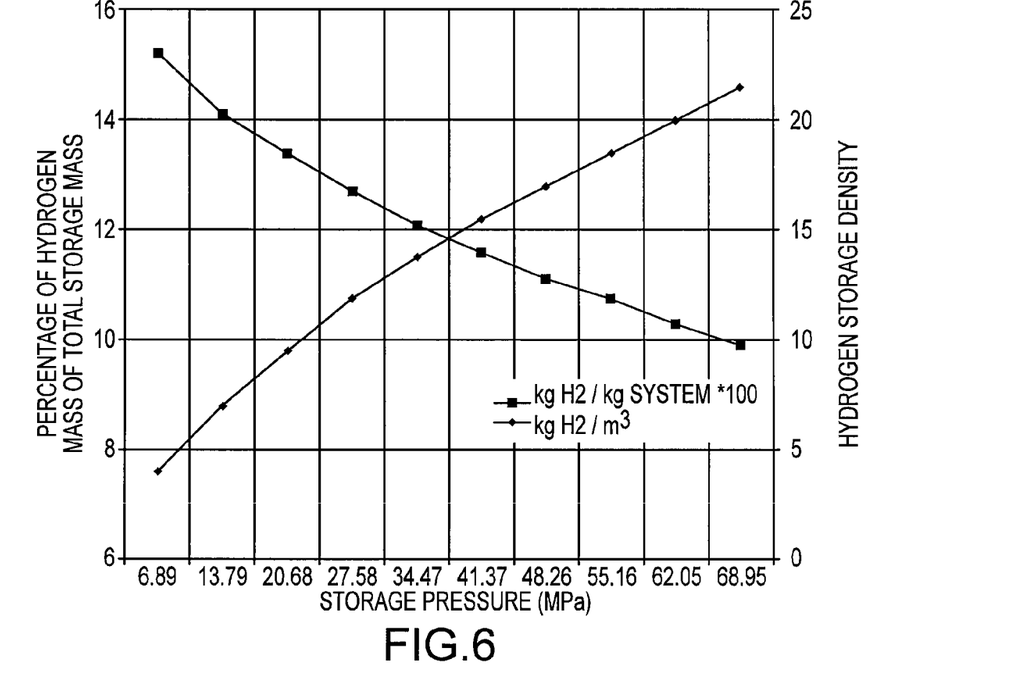
FIG. 6 Study of hydrogen mass fraction and volumetric density changes versus storage pressures FIG. 7 15 wt % Pu/55 wt % ZrH$_{1.6}$/30 wt % Th plus 5 wt % U-233 added to the blanket:Seed, Power Grade Plutonium; Blanket, ThC plus 5 wt % U-233
Figure 7:
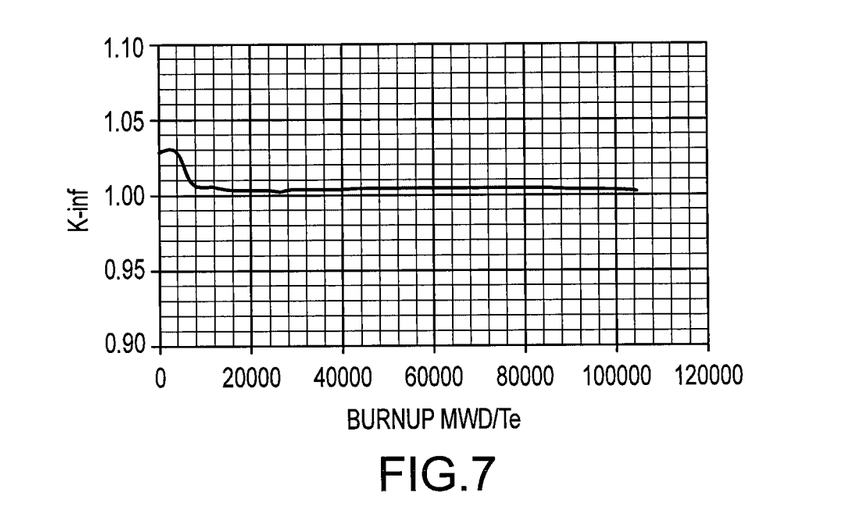
Figure 8:
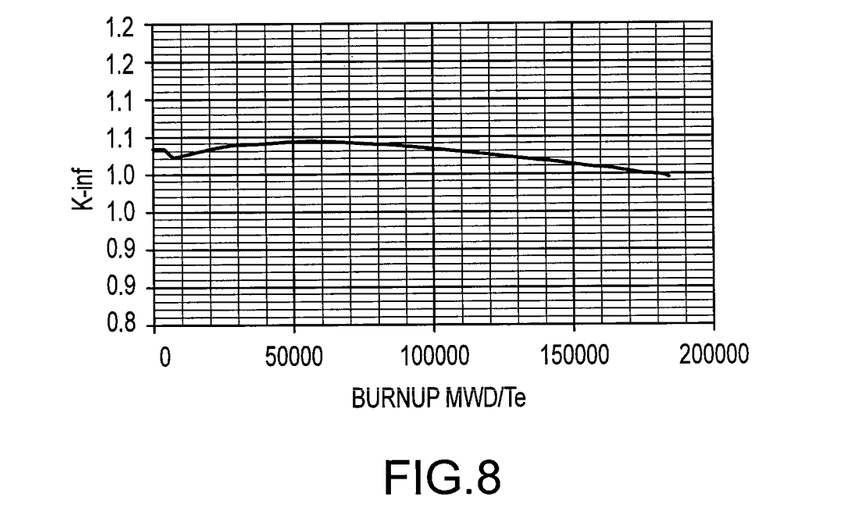
Figure 9:
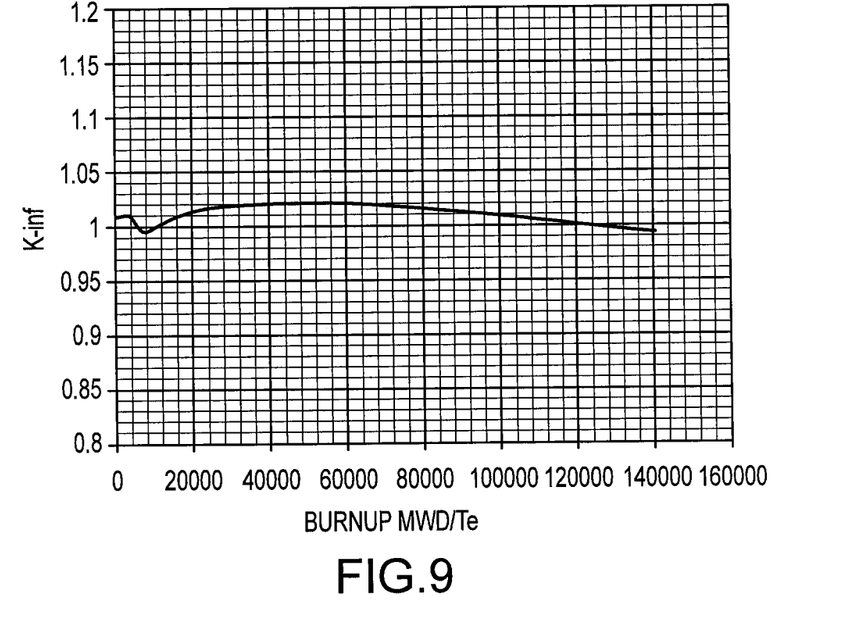
FIG. 9 PuZrH1.6 (no th) plus blanket only Thorium: Seed, Weapon Grade; Plutonium Blanket, ThC FIG. 10 15 wt % Pu/55 wt % ZrH1.6/30 wt % Th plus 7.5 PG added to the blanket: Seed, Power Grade Plutonium Blanket; ThC +7.5% Power Grade Plutonium FIG. 11 $K_\infty$ versus Plutonium concentration within Pu/ZrH1.6/Th matrix fuel FIG. 12 Reactivity Temperature Coefficient (Doppler) of Pu/ZrH1.6/Th Matrix Fuel
Figure 10:
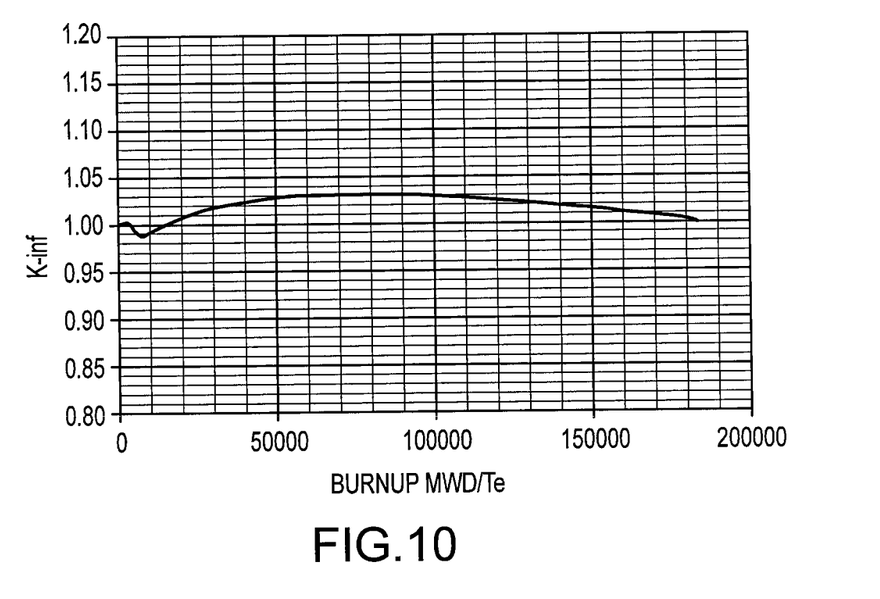

This increase in hydrogen permeability with temperature may allow the microspheres to maintain low hydrogen losses at storage conditions while providing sufficient hydrogen flow when needed. Engineered microspheres may provide for high density storage of hydrogen. For example, without limitation, a bed of 50 μm diameter engineered microspheres may be able to store hydrogen at 62 Mpa (9000 psi) with a safety factor of 1.5 and a hydrogen mass fraction of 10%. This may produce a hydrogen density of 20 kg/m$^3$. FIG. 6 shows how the hydrogen mass fraction and volumetric density may change under various storage pressures. This figure was taken from NASA report NASA/CR-2002-211867 "Hydrogen Storage for Aircraft Application Overview.

TABLE 2

Some Non-Limiting Examples of Fuel Elements Zones and Dimensions

| Zone | Radius (cm) | Material | Density (g/cm$^3$) |
|---|---|---|---|
| Fuel | 0.6225 | 15% reactor/weapon grade Pu, 55% ZrH$_{1.6}$ 30% Th by mass | 7.65 |
| Gap | 0.6308 | Helium | |
| Cladding | 0.6808 | Zircaloy4 = 0.98 Zr, 0.015 Sn, 0.002 Fe, 0.001 Cr | 6.56 |
| Graphite | 0.750 | Carbon | 1.75 |
| Coolant | 0.807 | Helium | <0.003 |
| Blanket | 1.707 | Thorium carbide = ThC | 10.67 |

TABLE 3

Density and Mass Fraction of Elements in Some Non-Limiting Pu/ZrH$_{1.6}$/Th Matrix Fuels

| Pu Wt % | ZrH1.6 Wt % | Th Wt % | Density gram/cm$^3$ | Pu-238 Wt % | Pu239 Wt % | Pu-240 Wt % | Pu-241 Wt % | Pu-242 Wt % | Total |
|---|---|---|---|---|---|---|---|---|---|
| Power Grade Plutonium | | | | | | | | | |
| 5 | 55 | 40 | 7.452763 | 0.05 | 3.1 | 1.1 | 0.6 | 0.15 | 5 |
| 7.5 | 55 | 37.5 | 7.5015 | 0.075 | 4.65 | 1.65 | 0.9 | 0.225 | 7.5 |
| 10 | 55 | 35 | 7.550879 | 0.1 | 6.2 | 2.2 | 1.2 | 0.3 | 10 |
| 12.5 | 55 | 32.5 | 7.600912 | 0.125 | 7.75 | 2.75 | 1.5 | 0.375 | 12.5 |
| 15 | 55 | 30 | 7.651612 | 0.15 | 9.3 | 3.3 | 1.8 | 0.45 | 15 |
| Weapon Grade Plutonium | | | | | | | | | |
| 5 | 55 | 40 | 7.452904 | 0 | 4.68 | 0.3 | 0.02 | 0 | 5 |
| 7.5 | 55 | 37.5 | 7.501715 | 0 | 7.02 | 0.45 | 0.03 | 0 | 7.5 |

TABLE 3-continued

Density and Mass Fraction of Elements in Some Non-Limiting Pu/ZrH$_{1.6}$/Th Matrix Fuels

| Pu Wt % | ZrH1.6 Wt % | Th Wt % | Density gram/cm$^3$ | Pu-238 Wt % | Pu239 Wt % | Pu-240 Wt % | Pu-241 Wt % | Pu-242 Wt % | Total |
|---|---|---|---|---|---|---|---|---|---|
| 10 | 55 | 35 | 7.551169 | 0 | 9.36 | 0.6 | 0.04 | 0 | 10 |
| 12.5 | 55 | 32.5 | 7.601279 | 0 | 11.7 | 0.75 | 0.05 | 0 | 12.5 |
| 15 | 55 | 30 | 7.652059 | 0 | 14.04 | 0.9 | 0.06 | 0 | 15 |

Possible reactivity swing during the burnup for some non-limiting examples is provided in FIGS. 7-10. As can be seen from these figures reactivity may vary between 0.1 to 5%. In some cases, reactivity may be controlled, for example, without limitation, by the use of a burnable poison or automated movement of graphite.

Reactor Control

In one embodiment of the reactor control design, reactivity may be controlled by dividing the graphite region into, for example without limitation, slices or leaves. In these design embodiments, the slices or leaves may move in and out of the active core region and may accommodate changes in the reactivity.

The Effect of Plutonium Content within the Pu/ZrH$_{1.6}$/Th matrix on the Reactivity As a part of the parametric study we examine the effect of plutonium content inside the matrix fuel. These calculations are presented in the FIG. 11.

Figure 11:
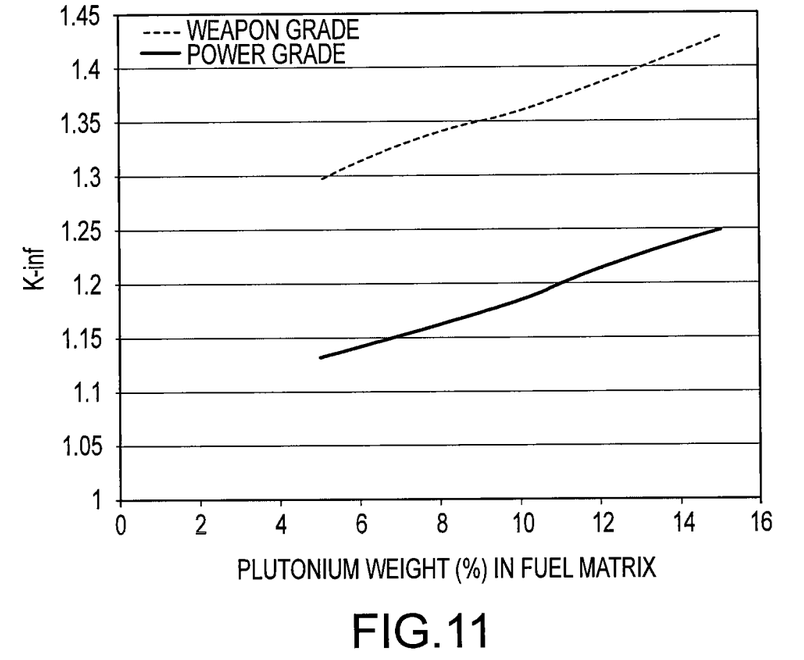

The graph in FIG. 11 shows that the for weapon grade plutonium a relatively small amount of plutonium quantity is required to achieved a strong neutron source, while for power grade plutonium (plutonium that came out of nuclear spent fuel) at less 15% of plutonium is required to have a strong neutron source for the entire fuel irradiation. The presence of thorium within the fuel indicates that this strong neutron source will be kept even during burnup due to partially compensation of depleted plutonium by building up of U-233, which has better neutronic characteristic than Pu-239 and U-235, in addition to other advantage as it was discussed in my proposal.

Safety Aspects of Pu/ZrH$_{1.6}$/Th Matrix Fuel

Figure 12:
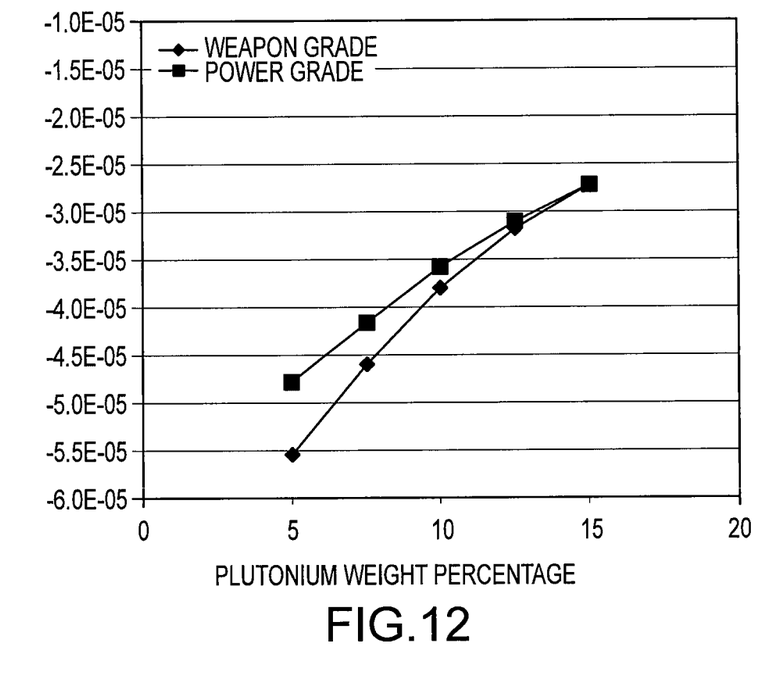

The reactivity coefficient of fuel temperature (Doppler Effect) is given in the equation below. The results also depicted in the FIG. 12 below for various plutonium grades and quantities of plutonium (within the Pu/ZrH$_{1.6}$/Th matrix fuel). Table 4 shows also the comparison of the proposed fuel with the common fuels used in LWR and Gas cooled reactor. As can be seen this fuel is safer from reactivity stand point view more than uranium oxide fuel. Since the moderator is within the fuel, the impact of the graphite temperature is insignificant. The proposed fuel can be also considered as inherently safe fuel.

$$\frac{\delta\rho}{\delta T} = \frac{K_{\infty T_2} - K_{\infty T_1}}{(T_2 - T_1) * (K_{\infty T_2} * K_{\infty T_1})}$$

TABLE 4

Comparison with Other Thermal Reactors

| | BWR | PWR | HTGR | (Pu/ZrH$_{1.6}$/Th) |
|---|---|---|---|---|
| Doppler (×10$^{-6}$) | −4 to −1 | −4 to −1 | −7 | −55 to −25 |
| Moderator (×10$^{-6}$) | −50 to −8 | −50 to −8 | +1 | −0.08 to −0.01 |

What is claimed is:

1. A transportable nuclear battery comprising:
a sealed reactor shell;
a reactor core;
a nuclear fuel in the reactor core, the nuclear fuel comprising plutonium, carbon, hydrogen, zirconium, and thorium, the hydrogen contained in glass microspheres coated with a burnable poison; and
a generator;
wherein the hydrogen is stored in the glass microspheres as a moderator to control reactivity of the reactor core.

2. The nuclear battery of claim 1, wherein the burnable poison comprises a thermal neutron absorber selected to increase absorption of neutrons in the thorium, such that depletion of the burnable poison during operation of the reactor core shifts an energy spectrum of the neutrons toward low neutron energy.

3. The nuclear battery of claim 2, wherein neutron hydrogen collisions inside the glass microspheres improve utilization of fissile material generated from the absorption of neutrons in the thorium.

4. The nuclear battery of claim 1, wherein the burnable poison comprises boron, boron carbide or erbium.

5. The nuclear battery of claim 1, further comprising a coating on the glass microspheres, the coating configured to aid in keeping the hydrogen within the glass microspheres at high temperature.

6. A high temperature gas cooled reactor comprising the nuclear battery of claim 5.

7. The nuclear battery of claim 1, wherein the nuclear fuel comprises a mixture of the hydrogen containing glass microspheres and fuel microspheres, the fuel microspheres comprising the uranium and plutonium.

8. The nuclear battery of claim 7, wherein the mixture of hydrogen containing glass microspheres and fuel microspheres is comprised within a fuel rod inserted into a moderator block.

9. The nuclear battery of claim 8, further comprising a plurality of fertile material pellets surrounding the fuel rod in the moderator block, the fertile material pellets comprising the thorium.

10. The nuclear battery of claim 9, wherein the reactor core is assembled with a plurality of such moderator blocks inside the reactor shell, the moderator blocks comprising graphite.

\* \* \* \* \*